ional Patent

United States Patent

[11] 3,622,549

| [72] | Inventor | William John Keller<br>Wilmington, Del. |
|---|---|---|
| [21] | Appl. No. | 853,529 |
| [22] | Filed | Aug. 27, 1969 |
| [45] | Patented | Nov. 23, 1971 |
| [73] | Assignee | E. I. du Pont de Nemours and Company<br>Wilmington, Del.<br>Continuation-in-part of application Ser. No.<br>536,641, Mar. 23, 1966, now abandoned.<br>This application Aug. 27, 1969, Ser. No.<br>853,529 |

[54] VULCANIZATION OF FLUOROELASTOMERS
11 Claims, No Drawings

[52] U.S. Cl. ..................................................... 260/80.77,
260/85.5 S, 260/87.7
[51] Int. Cl. ....................................................... C08f 27/08
[50] Field of Search ............................................ 260/80.77,
87.7, 85.5 S

[56] References Cited
UNITED STATES PATENTS

| 2,979,490 | 4/1961 | West ............................ | 260/87.5 |
| 3,041,316 | 6/1962 | Griffin .......................... | 260/79 |
| 3,322,744 | 5/1967 | Neville et al. ................ | 260/92.1 |
| 3,096,314 | 7/1963 | Stivers et al. ................ | 260/87.7 |
| 3,243,411 | 3/1966 | Tawney et al. ............... | 260/61 |

Primary Examiner—Joseph L. Schofer
Assistant Examiner—Stanford M. Levin
Attorney—Vernon R. Rice ABSTRACT: Process for vulcanizing fluoroelastomers by heating the elastomer in the presence of a secondary monoamine and an aromatic polyamine or aromatic polyol. Vulcanizates with outstanding physical properties are obtained from this reasonably rapid, low-scorch curing process.

3,622,549

VULCANIZATION OF FLUOROELASTOMERS

This application is a continuation-in-part of applicant's copending application, Ser. No. 536,641, now abandoned.

BACKGROUND OF THE INVENTION

Vulcanization of fluorine-containing polymers is often accomplished by using carbamates of aliphatic diamines such as ethylene diamine carbamate or the more generally preferred hexamethylene diamine carbamate as is disclosed in U.S. Pat. No. 2,979,490 to West. Unfortunately, during the processing of fluoroelastomer compositions, the carbamates of aliphatic diamines can promote scorching or premature vulcanization, which produces difficulty in processing and molding of the compositions into finished articles. Various attempts have been made to overcome the problem of scorching, but additional problems have thereby been introduced because the vulcanization systems which are satisfactory for scorch resistance are not entirely satisfactory in producing a highly developed cure in the fluoroelastomer, especially a cure with good resistance to compression set.

Curing fluoroelastomers with aromatic polyamines has been considered, but there are serious problems associated with their use, most important of which are (1) an extremely slow rate of reaction between the aromatic polyamines and the fluoroelastomers, (2) a poorly developed cure after vulcanization, particularly with regard to resistance to compression set, and (3) the need for high concentrations of the polyamines to achieve even a mediocre result.

U.S. Pat. No. 3,041,316 to Griffin discloses the room temperature cure of fluoroelastomers with a monoamine-aliphatic diamine or monoamine-aliphatic mercaptan system. While such systems are somewhat effective for special applications in which the elastomer is cured at room temperature, they are too scorchy for thermal cures at the temperatures necessary to process and shape fluoroelastomer stocks.

SUMMARY OF THE INVENTION

This invention provides a process for vulcanizing a fluoroelastomer by mixing said elastomer with (1) a dialkyl, dicycloalkyl, or alkylene secondary monoamine of not more than 24 carbon atoms in an amount which provides about 0.02–0.4 part of amino nitrogen per 100 parts of fluoroelastomer and (2) about 0.5–2 parts by weight per 100 parts of fluoroelastomer of a polyfunctional aromatic compound having no more than 3 aromatic rings and having at least 2 hydroxyl or primary amino groups attached to an aromatic nucleus, and heating the mixture to about 100°–250° C.

DETAILED DESCRIPTION

The curing process of this invention is applicable to any vulcanizable fluoroelastomer. By "fluoroelastomer" is meant a copolymer of vinylidene fluoride and at least one other ethylenically unsaturated fluorinated monomer. Such monomers ordinarily contain from 2 to 6 carbon atoms. Representative of such monomers are hexafluoropropene, tetrafluoroethylene, 1,2,3,3,3-pentafluoropropene, 1,1,3,3,3-pentafluoropropene, chlorotrifluoroethylene, perfluoroacrylic acid and its derivatives, such as the acid fluoride and perfluoroacrylonitrile. The copolymers usually contain at least about 30 percent by weight vinylidene fluoride.

Preferred copolymers are those derived from vinylidene fluoride and hexafluoropropene wherein the vinylidene fluoride is about 70 to 30 percent by weight and the hexafluoropropene is about 30 to 70 percent by weight. Other preferred copolymers are vinylidene fluoride/hexafluoropropene/tetrafluoroethylene terpolymers and copolymers of vinylidene fluoride and 1,2,3,3,3-pentafluoropropene or 1,1,3,3,3-pentafluoropropene. Further information regarding suitable copolymers and processes for their preparation can be found in U.S. Pat. Nos. 3,051,677 to Rexford and 2,968,649 to Pailthorp and Schroeder.

The secondary monoamines, which are a part of the vulcanization systems for the fluoroelastomers, are the dialkyl and dicycloalkyl secondary monoamines and the alkylene secondary monoamines each of which should have not more than about 24 carbon atoms. By "alkylene secondary monoamines" is meant those having both terminal carbons of the alkylene group attached to the >NH group as in piperidine. Representative dialkyl secondary monoamines are diethyl amine, dibutyl amine, and didodecyl amine. A representative dicycloalkyl secondary monoamine is dicyclohexylamine. The amounts of secondary monoamine which are useful are described best in terms of their nitrogen content, and they lie in the range of 0.02 to 0.4 parts of amino nitrogen per 100 parts by weight of the copolymer. Higher or lower amounts of the monoamines can be used. However, higher amounts increase the cost unduly and the state of vulcanization achieved by smaller quantities is undesirably low. The preferred amounts of secondary monoamine are those which provide about 0.1–0.2 part of amino nitrogen to the vulcanizing system. Since some of the secondary monoamines are volatile, e.g., diethyl amine, it is sometimes more practical to use them in the form of their salts, such as their carbamates or acetates, and the term "secondary monoamine" as used herein should be construed to include such salts.

The aromatic polyfunctional compounds which are part of the vulcanization system are those containing not more than 3 aromatic rings, wherein there are at least 2 hydroxyl or primary amino groups directly attached to an aromatic nucleus. Representative compounds are meta- and para-phenylene diamine, hydroquinone, 2,6-diaminotoluene, 2,4-di(p-aminobenzyl)aniline, p-aminophenol, 1,2,4-triaminobenzene, and methylene dianiline. Preferred compounds are p-phenylene diamine and hydroquinone because of their reasonable reaction rates and the outstanding vulcanizate properties they give. The amounts of the polyfunctional aromatic compounds needed for economical and rapid vulcanization are in the range of about 0.5–2 percent by weight of the copolymer. The preferred amounts are about 0.75–1.5 percent based on the copolymer.

The method of using the curing systems of this invention is to incorporate the components into a typical fluoroelastomer optionally containing conventional compounding agents such as a metal oxide and a reinforcing filler such as carbon black. The preferred method of incorporation is by milling on a 2-roll rubber mill, but other mixing equipment can be used. It is also practical to make solvent solutions of the copolymer and to incorporate the vulcanizing agents by stirring them into the solution. Regardless of the method used, the ingredients of the mixture can be incorporated separately, i.e., as the free monoamine and polyamine or their salts, or as complex compounds of the monoamine and polyol, or as mixed amine carbonates such as those shown in the examples. The monoamine and polyfunctional agents can be added simultaneously or consecutively.

After incorporating the vulcanizing system into the copolymer, vulcanization is effected by heating the composition at about 100°–250° C. Typically a two-step process is employed. In the first step, the compounded elastomer is cured in a press and compression mold to form the composition into desired products for use or for testing. The heating in this step is usually done at 150°–200° C. for 30 to 60 minutes. In the second step, the shaped piece is removed from the mold and the press and heating is continued at atmospheric pressure in an air oven for 18 to 24 hours at 200°–250° C. until a high state of vulcanization is reached.

The invention is illustrated by the following examples wherein parts and percentages are by weight unless otherwise specified.

EXAMPLE 1

Procedure for Compounding and Vulcanizing Copolymers

On a cool, 2-roll rubber mill, 100 parts of a copolymer of about 60 percent vinylidene fluoride and about 40 percent hexafluoropropene is compounded with 20 parts of medium thermal carbon black and 15 parts of magnesium oxide. Except as noted, 135 parts of this composition is used for further compounding with the vulcanizing agents described in the examples. After completion of the compounding, the compositions are sheeted off the mill and specimens for physical testing are prepared by compression molding in a press for 30 minutes at 190° C. followed by removing them from the mold, and "postcuring" by heating in an air oven to 204° C. over a 4-hour period and then an additional 24 hours at this temperature.

p-Phenylene Diamine and Diethyl Amine p-Phenylene diamine and diethyl amine are used as the vulcanizing agents in the proportions shown in table I. Care must be used to avoid prolonged milling and excessive temperature during milling, which conditions promote excessive volatilization of the amine. Typical results of physical tests on the vulcanizates are shown in table I.

TABLE I

|  | A | B | C | D | [1] X Control |
|---|---|---|---|---|---|
| Parts of p-phenylene diamine | 1.0 | 1.0 | 0.5 | 0.5 | 1 |
| Parts of diethyl amine | 0.1 | 1.0 | 1.0 | 2.0 |  |
| Physical properties measured (25° C.) -- |  |  |  |  |  |
| After press vulcanization for 30 min. at 190° C.: |  |  |  |  |  |
| Modulus at 100% elongation, p.s.i. | 200 | 600 | 350 | 500 | [2] |
| Tensile strength, p.s.i. | 750 | 1,700 | 1,575 | 1,425 | [2] |
| Elongation at break, percent | 750 | 265 | 365 | 255 | [2] |
| Permanent set at break, percent | 95 | 10 | 15 | 8 | [2] |
| After postcure at 204° C.: |  |  |  |  |  |
| Modulus at 100% elongation, p.s.i. | 400 | 1,450 | 820 | 1,275 | 200 |
| Tensile strength, p.s.i. | 2,250 | 2,400 | 1,550 | 1,575 | 1,280 |
| Elongation at break, percent | 220 | 135 | 160 | 125 | 510 |
| Permanent set at break, percent | 3 | 4 | 3 | 5 | 42 |
| Hardness, Durometer A |  | 74 | 71 | 73 | 61 |
| Compression set, 22 hrs. at 70° C. | 8 | 11 | 8 |  | 100 |

[1] Control experiment outside the invention for comparison only.
[2] Insufficient vulcanization.

If, for comparison, a mixture is made wherein 1 part of diethyl amine is used in the absence of p-phenylene diamine, after the 190° C. press vulcanization, there is not sufficient vulcanization to provide meaningful test data. After the 204° C. postcure, a tensile strength of 2,250 p.s.i., and an elongation at break of 355 percent are obtained, but the specimen for testing compression set resistance is porous due to insufficient vulcanization, and meaningful test data are not obtained.

EXAMPLE 2

Hydroquinone and Diethyl Amine

A compound of 2 moles of hydroquinone and 1 mole of diethyl amine is prepared by adding 6 parts of diethyl amine to 4.4 parts of hydroquinone dissolved in a vessel containing 53 parts of ethyl ether, and cooling the mixture in an ice bath. A crystalline appearing solid appears rapidly. After allowing the vessel and contents to stand overnight, the solid product is recovered by filtration and dried at 40° C. in a vacuum oven. Analysis for $C_{16}H_{23}O_4N$ shows 65.7 percent carbon, 8.0 percent hydrogen and 4.49 percent nitrogen.

The procedure of example 1 is followed using 2.9 parts of the above compound as the vulcanizing agent. The scorch test at 121° C., according to ASTM D-1646-61, shows that the compounded stock has a minimum value of 20 units and after 45 minutes, the value is only 30 units.

TABLE II

|  | After 190° C. Press Vulcanization | After 204° C. Postcure |
|---|---|---|
| Modulus at 100% Elongation, p.s.i. | 350 | 1,850 |
| Tensile Strength, p.s.i. | 1,375 | 2,150 |
| Elongation at Break, % | 450 | 115 |
| Permanent Set at Break, % | 20 | 4 |
| Hardness, Durometer A |  | 75 |
| Compression Set, 22 hrs. at 70° C. |  | 4.5 |

EXAMPLE 3 p-Phenylene Diamine and a High Molecular Weight Secondary Amine

The procedure of example 1 is followed with 1.1 parts of p-phenylene diamine and 3.5 parts of di-n-dodecylamine used as the vulcanizing agents.

TABLE III

|  | After 190° C. Press Vulcanization | After 204° C. Postcure |
|---|---|---|
| Modulus at 100% Elongation, p.s.i. | 300 | 1,100 |
| Tensile Strength, p.s.i. | 1,300 | 1,750 |
| Elongation at Break, % | 395 | 140 |
| Permanent Set at Break, % | 17 | 1 |
| Compression Set, 22 hrs. at 70° C., % |  | 9 |

EXAMPLE 4 p-Phenylene Diamine and a Heterocyclic Amine

A compound is formed by saturating with $CO_2$ at room temperature a solution made from 89 parts of tetrahydrofuran and 6.5 parts of p-phenylene diamine, and then introducing 5 parts of piperidine. A crystalline-appearing solid is formed which is filtered and dried in air at 25° C. Analysis for $C_{12}H_{19}N_3O$, shows 60.7 percent carbon, 8.0 percent hydrogen and 17.0 percent nitrogen.

The procedure of example 1 is followed using 1.8 parts of the above compound as the vulcanizing agent.

TABLE IV

| | After 190° C. Press Vulcanization | After 204° C. Posture |
|---|---|---|
| Modulus at 100% Elongation, p.s.i. | 400 | 1,200 |
| Tensile Strength, p.s.i. | 1,850 | 1,950 |
| Elongation at Break, % | 300 | 145 |
| Permanent Set at Break, % | 10 | 4 |
| Compression Set, 22 hrs. at 70° C., % | | 9 |

EXAMPLE 5 p-Phenylene Diamine—Diethyl Amine—$CO_2$ Compound

A compound of p-phenylene diamine, diethyl amine and $CO_2$ is prepared by dissolving, at room temperature, 54 parts of the p-phenylene diamine in 119 parts of methanol contained in a 2-neck glass flask, equipped for stirring and saturating the solution with $CO_2$. To the saturated solution, maintained under a $CO_2$ atmosphere, 36.5 parts of diethyl amine is introduced dropwise with stirring during 3 hours. The solvent is then removed under vacuum and a finely divided, brown powder is recovered. This is passed through a 40-mesh screen before use. Analysis for $C_{11}H_{19}O_2N_3$ shows 59.6 percent carbon, 7.8 percent hydrogen and 17.6 percent nitrogen.

The procedure of example 1 is followed using 2.2 parts of the above compound as the vulcanizing agent. The scorch test at 121° C. according to ASTM D-1646-61 shows that the compounded stock has a minimum value of 24 units and after 45 min. running, the value is 45 units.

The following physical properties are obtained at 25° C.:

TABLE V

| | After 190° C. Press Vulcanization | After 204° C. Postcure |
|---|---|---|
| Modulus at 100% Elongation, p.s.i. | 700 | |
| Tensile Strength, p.s.i. | 1,400 | 1,450 |
| Elongation at Break, % | 170 | 60 |
| Permanent Set at Break, % | 4 | 4 |
| Compression Set, 22 hrs. at 70° C. | 42 | 8 |
| Hardness, Durometer A | 74 | 80 |

EXAMPLE 6

Vulcanization of a Vinylidene Fluoride/ 1,2,3,3,3-Pentafluoropropene Copolymer

The procedure of example 1 is followed except the copolymer used is a copolymer containing 77 mole percent of vinylidene fluoride and 23 mole percent of 1,2,3,3,3-pentafluoropropene. The vulcanizing agent is the compound of example 5 and 1.5 parts are used. The following physical properties are obtained at 25° C.:

TABLE VI

| | After 190° C. Press Vulcanization | After 204° C. Postcure |
|---|---|---|
| Modulus at 100% Elongation, p.s.i. | 200 | 1,000 |
| Tensile Strength, p.s.i. | 300 | 2,300 |
| Elongation at Break, % | 1,000 | 170 |
| Permanent Set at Break, % | 187 | 2 |

EXAMPLE 7

Vulcanization of a Vinylidene Fluoride/ Hexafluoropropene/Tetrafluoroethylene Copolymer with Methylenedianiline and Diethyl Amine At about 20° C. a solution of 15 parts diethyl amine in 89 parts of tetrahydrofuran is stirred in a closed glass vessel. An atmosphere of $CO_2$ is maintained in the vessel until $CO_2$ absorption stops. A solution of 39.6 parts of methylenedianiline in 50 volumes of tetrahydrofuran is added dropwise to the diethyl amine solution while simultaneously maintaining the atmosphere of $CO_2$. When $CO_2$ absorption stops, the reaction mass which is now a white slurry is filtered, and solvent is removed under vacuum at room temperature. Melting point of the solid product recovered is about 82°–85° C.

The procedure of example 1 is followed using 2.4 parts of the above compound as the vulcanizing agent, except the copolymer used is a vinylidene fluoride, tetrafluoroethylene, hexafluoropropene copolymer, containing the following respective mole percentages: 36, 39, and 25, and the press cure is 40 min. at 200° C.

TABLE VII

Physical Properties Obtained From Postcured Specimens

| | Measured at 25° C. | 100° C. |
|---|---|---|
| Modulus at 100% Elongation, p.s.i. | 940 | 430 |
| Tensile strength, p.s.i. | 3,000 | 750 |
| Elongation at Break, % | 280 | 250 |
| Permanent Set at Break, % | 11 | 8 |
| Hardness, Durometer A | 84 | |
| Compression Set, 22 hrs. at 70° C. | 25 | |
| Compression Set, 70 hrs. at 121° C. | 28 | |

EXAMPLE 8

A compound is formed by saturating with $CO_2$ at room temperature a solution made from 133 parts of tetrahydrofuran and 8 parts of p-phenylenediamine and then introducing 13.2 parts of dicyclohexylamine while maintaining the $CO_2$ atmosphere. A solid forms rapidly and is recovered by filtration. This solid (20 parts) is treated at room temperature in a "Rotovac" to remove residual solvent. Analysis for $C_{18}H_{31}N_3O_2$ shows 69.1 percent carbon; 9.7 percent hydrogen; and 10.8 percent nitrogen.

The procedure of example 1 is followed using 2.5 parts of the above compound as the vulcanizing agent.

TABLE VIII

PHYSICAL PROPERTIES MEASURED (25° C.)

After Press Vulcanization for 30 Minutes at 190° C.

| | |
|---|---|
| Modulus at 100% Elongation—p.s.i. | 300 |
| Tensile Strength—p.s.i. | 1,650 |
| Elongation at Break—% | 310 |
| Permanent Set at Break—% | 10 |

After Postcure at 204° C.

| | |
|---|---|
| Modulus at 100% Elongation—p.s.i. | 800 |
| Tensile Strength—p.s.i. | 2,250 |
| Elongation at Break—% | 190 |
| Permanent Set at Break—% | 6 |
| Compression Set, 22 hrs. at 70° C. % | 14 |

The copolymer compositions containing the vulcanization systems of this invention are superior to compositions based on carbamates of aliphatic diamines, because they combine safety from premature vulcanization (scorch) during processing with excellent elastomeric properties after the two-step vulcanization process. In many of the compositions a high level of elastomeric properties is attained after the first step of the vulcanization process indicating the unusual efficiency of the novel systems. All this is achieved with low concentrations of the curing system.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

EXAMPLE 9

For comparison purposes, the copolymer of example 1 is vulcanized with two curing systems of this invention and several of the prior art.

Six samples (A–F) of the compounded vinylidene fluoride/hexafluoropropene copolymer are prepared by milling 100 parts of the copolymer, 20 parts of medium thermal carbon black and 15 parts of magnesium oxide on a cool, 2-roll rubber mill as described in example 1. A curing system consisting of 1.5 parts of diethyl amine and 1.5 parts of a polyfunctional aromatic compound in samples A through E and 3 parts of phenylene diamine in sample F is milled into each stock.

After completion of the compounding, the Mooney Scorch properties of each sample at 250° F. are determined immediately after milling and after storage in a refrigerator at 2.5° C. for 1 week. Results are given in table IX.

TABLE IX

| Sample | A | B | C[1] | D[1] | E[1] | F[1] |
|---|---|---|---|---|---|---|
| Parts by weight: | | | | | | |
| Diethyl amine | 1.5 | 1.5 | 1.5 | 1.5 | 1.5 | 0 |
| p-Phenylene diamine | 1.5 | | | | | |
| Hydroquinone | | 1.5 | | | | |
| Hexamethylene diamine | | | 1.5 | | | |
| Piperazine | | | | 1.5 | | |
| Hexamethylene dithiol | | | | | 1.5 | |
| p-Phenylene diamine | | | | | | 3.0 |
| Mooney scorch, 121° C., immediately after milling: | | | | | | |
| M₀ (initial reading) | 22 | 22 | 148 | 27.5 | 23 | 21.3 |
| T₅ (minutes to 5 point rise) | 29.5 | 47.5 | 4.25 | 5.5 | 5.0 | (²) |
| T₁₀ (minutes to 10 point rise) | 39.5 | 58.2 | 5.0 | 6.5 | 6.0 | (²) |
| Mooney scorch, 121° C., after 1 week storage at 2.5° C.: | | | | | | |
| M₀ (initial reading) | 25.5 | 25.5 | >200 | >200 | 96 | 24 |
| T₅ (minutes to 5 point rise) | 30.5 | 45.5 | | | 1.5 | (³) |
| T₁₀ (minutes to 10 point rise) | 39.5 | >45 | | | 1.8 | (³) |

[1] Outside the invention.
[2] No rise in 70 minutes.
[3] No rise in 45 minutes.

The Mooney Scorch tests were carried out according to ASTM D–1646. All samples but F, which did not cure, had good physical properties after a press cure for 30 minutes at 190° C. and after post cure in an air oven at 204° C. for 4 hours and heating an additional 24 hours at 204° C.

It is apparent from the table that samples C, D and E are very scorchy. Sample C is nearly cured before its Mooney viscosity is measured and the Mooney viscosity of D and E rise very rapidly after the curing agent is added. Samples A and B cure at a moderately rapid rate. Sample F does not cure at all. The data also show that samples C, D and E cannot be stored for as long as a week even at low temperatures as they are nearly completely cured after a week's storage at 2.5° C. Samples A and B are very stable during the same low temperature storage period.

The data above show that (1) fluoroelastomer cured with the prior art secondary monoamine-aliphatic diamine systems are very scorchy, i.e., they prematurely vulcanize to the point that they cannot be shaped or molded in a reasonable time after the curing agent is added, (2) aromatic polyfunctional compounds alone do not cure fluoroelastomers at a reasonable temperature and after a reasonable time, and (3) the monoamine-aromatic polyfunctional compound curing agents of this invention cure fluoroelastomers at a suitable rate, allowing time for shaping during vulcanization, to yield high quality vulcanizates.

What is claimed is:

1. In the process of vulcanizing a fluoroelastomer which is a copolymer of vinylidene fluoride and at least one other ethylenically unsaturated fluorinated monomer containing from two to six carbon atoms with an amine curing agent at a temperature of about 100°–200° C., the improvement consisting essentially of using as the curing agent a combination of (1) a dialkyl, dicycloalkyl, or alkylene secondary monoamine of not more than about 24 carbon atoms in an amount providing about 0.02–0.4 part of amino nitrogen per 100 parts of said fluoroelastomer, and (2) about 0.5–2 percent by weight of said fluoroelastomer of a polyfunctional aromatic compound having no more than 3 aromatic rings and having at least 2 hydroxyl or primary amino groups directly attached to an aromatic nucleus.

2. A process of claim 1 wherein said monoamine (1) is diethyl amine, didodecyl amine, dicyclohexyl amine, or piperidine, and the aromatic compound (2) is hydroquinone, meta- or para-phenylene diamine, 2,6-diaminotoluene, 2,4-di(p-aminobenzyl)aniline, p-aminophenol, 1,2,4-triaminobenzene or methylene dianiline.

3. A process of claim 1 wherein the amount of secondary monoamine (1) provides about 0.1–0.2 part of nitrogen per 100 parts of fluoroelastomer, and the amount of aromatic compound (2) is about 0.75–1.5 percent by weight of said fluoroelastomer.

4. A process of claim 3 wherein said secondary monoamine (1) is diethyl amine and said compound (2) is para-phenylene diamine, methylene dianiline or hydroquinone.

5. A process of claim 1 wherein the aromatic compound is hydroquinone.

6. A process of claim 4 wherein the aromatic compound is hydroquinone.

7. A process of claim 4 wherein the fluoroelastomer is a copolymer of vinylidene fluoride and hexafluoropropene; vinylidene fluoride, hexafluoropropene and tetrafluoroethylene; or vinylidene fluoride and 1,2,3,3,3-pentafluoropropene.

8. A process of claim 4 wherein the fluoroelastomer is a copolymer of vinylidene fluoride and hexafluoropropene.

9. A process of claim 1 wherein the secondary monoamine is diethyl amine, dibutyl amine, didodecyl amine, piperidine or dicyclohexyl amine and the fluoroelastomer is a copolymer of vinylidene fluoride and (a) hexafluoropropene, (b) tetrafluoroethylene, (c) 1,2,3,3,3-pentafluoropropene, (d) 1,1,3,3,3-pentafluoropropene, (e) chlorotrifluoroethylene, (f) perfluoroacrylic acid, (g) perfluoroacrylonitrile or (h) the acid fluoride of perfluoroacrylic acid.

10. A process of claim 19 wherein the aromatic compound is hydroquinone, methylene dianiline or para-phenylene diamine.

11. A process of claim 10 wherein the fluoroelastomer is a copolymer of vinylidene fluoride and hexafluoropropene.

* * * * *